United States Patent
Seifert et al.

(10) Patent No.: US 10,623,203 B2
(45) Date of Patent: Apr. 14, 2020

(54) BUS SYSTEM COMPRISING A MASTER COMPONENT AND A SLAVE COMPONENT THAT FUNCTIONS AS MASTER, AND A METHOD FOR CONTROLLING THE SAME

(71) Applicant: Gentherm GmbH, Odelzhausen (DE)

(72) Inventors: Michael Seifert, Augsburg (DE); Stefan Stöwe, Mering (DE); Karim Andreu, München (DE)

(73) Assignee: GENTHERM GMBH, Odelzhausen (DE)

( * ) Notice: Subject to any disclaimer, the term of this patent is extended or adjusted under 35 U.S.C. 154(b) by 291 days.

(21) Appl. No.: 15/502,294

(22) PCT Filed: Aug. 5, 2015

(86) PCT No.: PCT/DE2015/000390
§ 371 (c)(1),
(2) Date: Feb. 7, 2017

(87) PCT Pub. No.: WO2016/019938
PCT Pub. Date: Feb. 11, 2016

(65) Prior Publication Data
US 2017/0230196 A1 Aug. 10, 2017

(30) Foreign Application Priority Data

Aug. 8, 2014 (DE) .................. 10 2014 011 537

(51) Int. Cl.
*G05B 13/00* (2006.01)
*H04L 12/40* (2006.01)
(Continued)

(52) U.S. Cl.
CPC ........ *H04L 12/40169* (2013.01); *F24F 11/30* (2018.01); *F24F 11/62* (2018.01);
(Continued)

(58) Field of Classification Search
CPC .................................................. F24F 11/0086
(Continued)

(56) References Cited

U.S. PATENT DOCUMENTS

| 6,032,178 A * | 2/2000 | Bacigalupo ........... G06F 13/364 709/200 |
| 7,171,573 B2 * | 1/2007 | Scheele ................. H04J 3/0664 713/375 |

(Continued)

FOREIGN PATENT DOCUMENTS

| CN | 1386346 A | 12/1820 |
| CN | 201261413 Y | 6/2009 |

(Continued)

OTHER PUBLICATIONS

"LIN Specification Package", LIN Consortium, Dec. 31, 2010, Figure 2.9, Section 2.3.3.1, http://www.cs-group.de/fileadmin/media/Documents/LIN_Specification_Package_2.2A.pdf, last accessed Feb. 2, 2017.

(Continued)

*Primary Examiner* — Suresh Suryawanshi
(74) *Attorney, Agent, or Firm* — The Dobrusin Law Firm, P.C.

(57) ABSTRACT

A bus system is disclosed which comprises a plurality of electrical and/or electronic components coupled to one another in terms of signaling via at least one bus line, said components including at least one master component and at least two slave components. At least one of the slave components functions as a master for one or a plurality of the further slave components for at least one operating parameter. There is additionally disclosed a method for controlling such a bus system comprising a plurality of electrical or electronic components coupled to one another in terms of signalling via at least one bus line, wherein at least one of the slave components operates as a master for (Continued)

one or a plurality of the further slave components for at least one operating parameter.

16 Claims, 7 Drawing Sheets

(51) Int. Cl.
    *F24F 11/62*     (2018.01)
    *F24F 11/30*     (2018.01)
    *G05B 15/02*     (2006.01)
    *F24F 11/63*     (2018.01)

(52) U.S. Cl.
    CPC .............. *G05B 15/02* (2013.01); *F24F 11/63* (2018.01); *G05B 2219/2231* (2013.01); *G05B 2219/2614* (2013.01); *H04L 2012/40215* (2013.01); *H04L 2012/40234* (2013.01); *H04L 2012/40273* (2013.01)

(58) Field of Classification Search
    USPC .......................................................... 700/276
    See application file for complete search history.

(56) References Cited

U.S. PATENT DOCUMENTS

| | | | |
|---|---|---|---|
| 7,340,544 B2* | 3/2008 | Jeong | G06F 13/362 345/504 |
| 7,475,559 B2* | 1/2009 | Gleeson | B60H 1/00585 307/10.1 |
| 7,792,155 B2* | 9/2010 | Koga | G05B 19/41855 370/389 |
| 9,007,951 B2* | 4/2015 | Reidl | H04L 25/4904 370/229 |
| 10,037,364 B1* | 7/2018 | Kalinichenko | G06F 16/248 |
| 2006/0069452 A1* | 3/2006 | Pfister | H04L 41/0803 700/18 |
| 2012/0221755 A1* | 8/2012 | Schultz | G05B 19/4185 710/110 |

FOREIGN PATENT DOCUMENTS

| | | | | |
|---|---|---|---|---|
| CN | 103038091 A | | 4/2013 | |
| DE | 10261736 A1 | * | 7/2004 | ......... B60H 1/00642 |
| DE | 102013201471 A1 | | 7/2014 | |
| EP | 1385093 A1 | | 1/2004 | |
| EP | 1594262 A2 | | 11/2005 | |
| JP | 2002/044109 A | | 2/2002 | |
| JP | 2004/064769 A | | 2/2004 | |
| JP | 2006/148911 A | | 6/2006 | |

OTHER PUBLICATIONS

International Search Report from the European Patent Office for Application No. PCT/DE2015/000390, dated Nov. 20, 2015.
Written Opinion from the European Patent Office for Application No. PCT/DE2015/000390, dated Nov. 20, 2015.
Japanese Notice of Reasons for Refusal, JP Application No. 2017-506976, drafting date Mar. 28, 2018.
Chinese Office Action, CN Application No. 201580042639.9, dated Feb. 2, 2019.

* cited by examiner

BUS SYSTEM COMPRISING A MASTER COMPONENT AND A SLAVE COMPONENT THAT FUNCTIONS AS MASTER, AND A METHOD FOR CONTROLLING THE SAME

FIELD

The present invention relates to a bus system which comprises a plurality of electrical and/or electronic components coupled to one another in terms of signaling via at least one bus line, said bus system having the features of the teachings herein. The invention also relates to a method for controlling such a bus system, having the features of the teachings herein.

BACKGROUND

Various electronic bus systems are known for controlling electrical and electronic components in motor vehicles; hereinafter these will be referred to generally as "bus systems". In motor vehicle engineering, in particular CAN bus systems (controller area network bus systems) and LIN bus systems (local interconnect network bus systems) are used. CAN bus systems of broad extent are distinguished by a high data throughput rate, but such systems are more expensive that the slower LIN bus systems, due to their relatively high complexity. In particular, CAN bus systems require a two-part data line, whereas LIN bus systems are designed with and function with only a single data line, with savings of substantial line materials. Particularly for this reason, LIN bus systems are used in the motor vehicle industry in a number of systems which are not of safety significance and/or at least for periods of time are assigned a subordinate priority. Examples of such applications which can be controlled with LIN bus systems without problems are: automobile doors, automobile seats, and automobile windows.

In particular, regarding automobile seats, for some time not only have customary electrical seat heating devices been used, but increasingly air conditioning devices have also come to be used. These systems, referred to as "air conditioned seats", contain not only seat heating means for temperature control, but also a supplemental ventilation system (air supply system) for the seat. The objective of an air conditioned seat is to actively influence the micro-climate at the seat, by cooling and/or ventilation of the contact surface between the occupant of the vehicle and the vehicle seat, in order to increase comfort. Seat air conditioning systems are already known which function via a so-called "master-slave system" and thereby communicate via bus systems. In these systems, the bus master components assume a number of functions, such as e.g. electrical adjustment of the seat position, seat memory management, and/or so-called "seat pneumatics", and in addition they perform the central control function for the air conditioned seat. Additionally, the master component makes available the corresponding seat heating outputs for connection to additional lines. In a "standard configuration", the master component assumes the task of decision-making. To the extent that the master component is an "intelligent" unit, it is able to control itself during a control exercise, depending on at least one measured quantity associated with another component (a slave component). The slave components, on the other hand, as a rule, follow control signals from an intelligent component.

Such a system with a LIN control bus is known, e.g. from DE 10 2013 201471 A1. The LIN control bus disclosed there is claimed to have low power consumption and high availability. Further, a so-called "silent" or "still" mode is proposed, which provides a power saving mode for phases in which active control commands are not being exchanged. A transition from this "silent" or "still" mode into an active "monitoring mode" is possible, as soon as it is time for active control of at least one component. However, this arrangement substantially increases the complexity of the bus master, leading to higher costs.

Other seat air conditioning systems are known which are comprised of so-called "seat climate conditioning control units". These have their own line outputs for vehicle seat heating and ventilation, and they assume a central control function. However, they have the drawback that with vehicle seats which are equipped only with seat heating means, regulation variants arise, e.g. through underequipping or through software conflicts. This leads to increased costs due to the additional development work required, modification of production processes, or logistics problems. Further, with this approach, the available installation space of the climate conditioning unit is not optimally used.

SUMMARY

The object of the present invention was to devise a bus system having a simple structure, e.g. for use in climate conditioning devices for motor vehicles, which do not require an additional seat air conditioning control unit, so that the complexity of the control system can be reduced, and thereby the fabrication costs can be reduced.

This objective is achieved by a bus system having the features of the teachings herein. Additional advantageous refinements are set forth herein.

To solve the problem presented by the aforesaid object, the invention proposes a bus system comprised a plurality of electrical and/or electronic components coupled to one another in terms of signaling via at least one bus line, said system having the features of the teachings herein. The electrical and/or electronic components include at least one master component and at least two slave components, wherein at least one of the slave components functions as a master for issuing commands to one or a plurality of the further slave components, for at least one operating parameter, i.e. it sends more or less independent control signals to other slave components. The system has a single master component, to be sure, but it also has one or more slave components which, partially or completely autonomously, i.e. at least partially independently of the master component, are capable of sending their own control signals and control commands to other slave components without such signal transmission being influenced by the master component. These slave components function, at least temporarily, as master components with respect to other slave components. Since the term "master" is reserved for designation of the sole "true" master in the system, one might use the term "command issuer" to apply to a slave component which issues commands; this will distinguish that component from the "true" master. In the bus system, thus, at least one "set point operating parameter" may be determined (e.g. calculated) by at least one slave component, for another slave component, and this parameter may be sent to the latter and/or to the master component itself. Thereby it is possible to selectively provide that the first slave component is to be assigned a central control function for a particular system which is to be controlled, which control function will be communicated to other slave components and/or master components, or to the entire system which is to be controlled. With the bus system, it may be advantageous if the first slave component, which is at least temporarily acting, similarly to a master, as a command issuer with respect to other slave components, recognizes its status as a component of the system to be controlled, by means of bus signals and/or messages which are transmitted to it and are evaluated by it.

In the inventive bus system, which is comprised of:
at least one bus line;
a master component; and
at least one first and one second slave component;
the bus component, over which communication between the master and the slave components occurs, may be, e.g., a LIN bus line, but optionally it may be a CAN bus line. In the system, the first slave component has a central control function for a system to be controlled. Via messaging which occurs, the first slave component recognizes whether it is to function as a component of the system to be controlled. Thus, preferably, the first slave component thus assumes the control function for the entire system to be controlled. Following a request via the master component, the first slave component sends appropriate messages to at least the second slave component, which is associated with the first slave component. The message reduces the master component to merely a functional stage within the system. The first slave component processes the message from the master component in conjunction with other information which is available.

This procedure provides the advantage of being able to operate one or more components in the bus line which components do not have their own respective component outputs. Instead the first and second slave components are independent component systems which can communicate via the bus line of the bus system(s).

In particular, the inventive bus system is suitable for controlling an air conditioning device, particularly the air conditioning means of an air-conditioned seat. The control means of said air conditioning means comprises a master component which is connected via a bus line to a first slave component in the form of, e.g., seat heating means, and at least one second slave component in the form of, e.g., seat ventilation means. The seat heating and seat ventilation means are independent components which communicate over the bus system and exchange electrical signal data. In this arrangement, the seat heating component alone assumes the central control function for the overall seat "climate control" system, and thus serves as a command issuer of the seat ventilation, similarly to a master. For this, typically a (in English) "body control module", a "climate control device", or a "seat control module" is provided. Accordingly, the seat heating component is comprised of a seat heating controller, which performs a control function for a climate-controlled seat. The seat heating device is also able to operate one or more seat ventilation components, without having its own ventilation output.

The seat heating components are informed by messages which are present in the bus line as to whether they are a component of a climate-controlled seat. The (such) messages thus reduce the master component to merely a functional stage of the seat heating or climate-controlled seat system. The settings may comprise, e.g. setting the seat heating to "heating stage 1" or "climate control stage 2". The seat heating component processes this message in conjunction with other available information. This information may consist of, e.g., a seat heating temperature. In response to a request from the master component, the seat heating component sends appropriate messages to the seat ventilation components associated with the seat heating component(s). Then the seat heating component(s) control the corresponding seat ventilation components.

E.g., prior to starting of the climate control device, parameterization of various target temperatures of the seat heating component, or blower rotational speed target values of the seat ventilation components, may be carried out in order to set up various seat condition variants. Thus, various setting stages for setting the climate-controlled seat may be defined which an operator can select via an operating element, e.g. setting the seat heating to "heating stage 1" or setting the seat ventilation to "air conditioning stage 2". "Heating stage 1" may represent, e.g. a seat heating temperature of 33-35° C. This does not require any technical modifications to the climate control device.

This arrangement offers the advantage over customary bus systems that vehicle seats can be upgraded with seat heating means of the above-described type by merely adding a seat ventilation component to a climate-controlled seat. This does not require technical modification of the seat heating component or of the master component. Further, ordinary commercially available seat heating and seat ventilation components can be employed, without the need to provide an additional seat air conditioning control unit. An economically advantageous solution is provided for a bus system used for a climate control device of a climate-controlled seat.

To solve the problem underlying the above-described object of the invention, the invention also proposes a method for controlling a bus system which system is comprised of a plurality of electrical or electronic components coupled to one another in terms of signaling via at least one bus line, which method has the features of the teachings herein. The components referred to comprise at least one master component and at least two slave components. According to the method, at least one of the slave components functions as a master for one or more of the other slave components, for at least one operating parameter and/or for a defined operating interval. Thus, the at least one slave component, which at least temporarily functions as a master for other slave components, determines (calculates) at least one set-point operating parameter of another slave component, and transmits this to said other slave component and/or to the master component. In this way, this first slave component can be associated with a central control function for a system which is to be controlled, which function is communicated to other components or to the entire system which is to be controlled.

Preferably, according to the method, one may provide that the first slave component recognizes its status as a component of the system which is to be controlled, said recognition being via bus signals and/or bus messages which are transmitted to it and are evaluated. Optionally, it may be provided that the first slave component transmits appropriate signals to the at least one second slave component associated with the first slave component only after receiving a request from the master component. The sending of the message will reduce the master component to merely a functional stage within the system. It may also be advantageous if the first slave component further processes the signals from the master component in conjunction with other available information. This procedure provides the advantage of being able to operate one or more components in the bus line which components do not have their own component outputs. Instead, the first and second slave components are each independent component systems which communicate over the bus line of the bus system.

Another application of the invention involves a method of controlling a climate-controlled seat. The master component of the system is equipped, e.g., with an operating element in the interior of the vehicle for inputting a temperature value for setting the seat heating means, or for inputting an air blower rotational speed value for setting the seat ventilation means. When a value is entered via the operating element, this is transmitted via the master component to the seat heating component, via the bus line, since the output of the master component reduces it to merely a functional stage. If the input consists of a command to set the temperature value of the seat heating means, e.g. to set the seat heating means to "heating stage 1", this is carried out directly by the seat heating component, because it has assumed the central control function of the system.

According to another control procedure, as an additional input, a command may be sent for setting the seat ventilation, e.g. for setting it to "air conditioning stage 2", by means of the operating element of the master component. Due to the functional status of the master component, the command is transmitted to the seat heating component via the bus line. Since the seat heating component is functioning with a central control function, the command is transmitted from the seat heating component to the seat ventilation component via the bus line, and is ultimately executed by the seat ventilation component.

The inventive bus system conceivably may be used in a variety of vehicle interior systems, in addition to a heating and air conditioning device in which the customary heating functions can be assumed using a ventilation system operated with a LIN bus, in order to, e.g., optimize interior comfort. In addition, e.g., the inventive bus system may be employed in a neck heating system, in which seat heating means take over the control of a neck heating blower, so as to establish the best combination of the seat heating temperature and the neck heating air volume.

It is also possible to employ the inventive bus system in a bed temperature control system, in office chairs, or stadium seats, employing both heating means and a blower or intelligent thermoelectric devices. The area of (in English) micro thermal modules is another possible area of application, in which seat heating means assume control of blowers and thermal elements for cooling or heating.

BRIEF DESCRIPTION OF THE DRAWINGS

In the following, exemplary embodiments of the invention and their advantages will be described, with reference to the accompanying drawings. The size relationships of the individual elements in the drawings do not always correspond to the actual relationships, given that some of the representations have been simplified, and others have been enlarged in relation to other elements, for the sake of better illustration.

DETAILED DESCRIPTION

Figure 1:
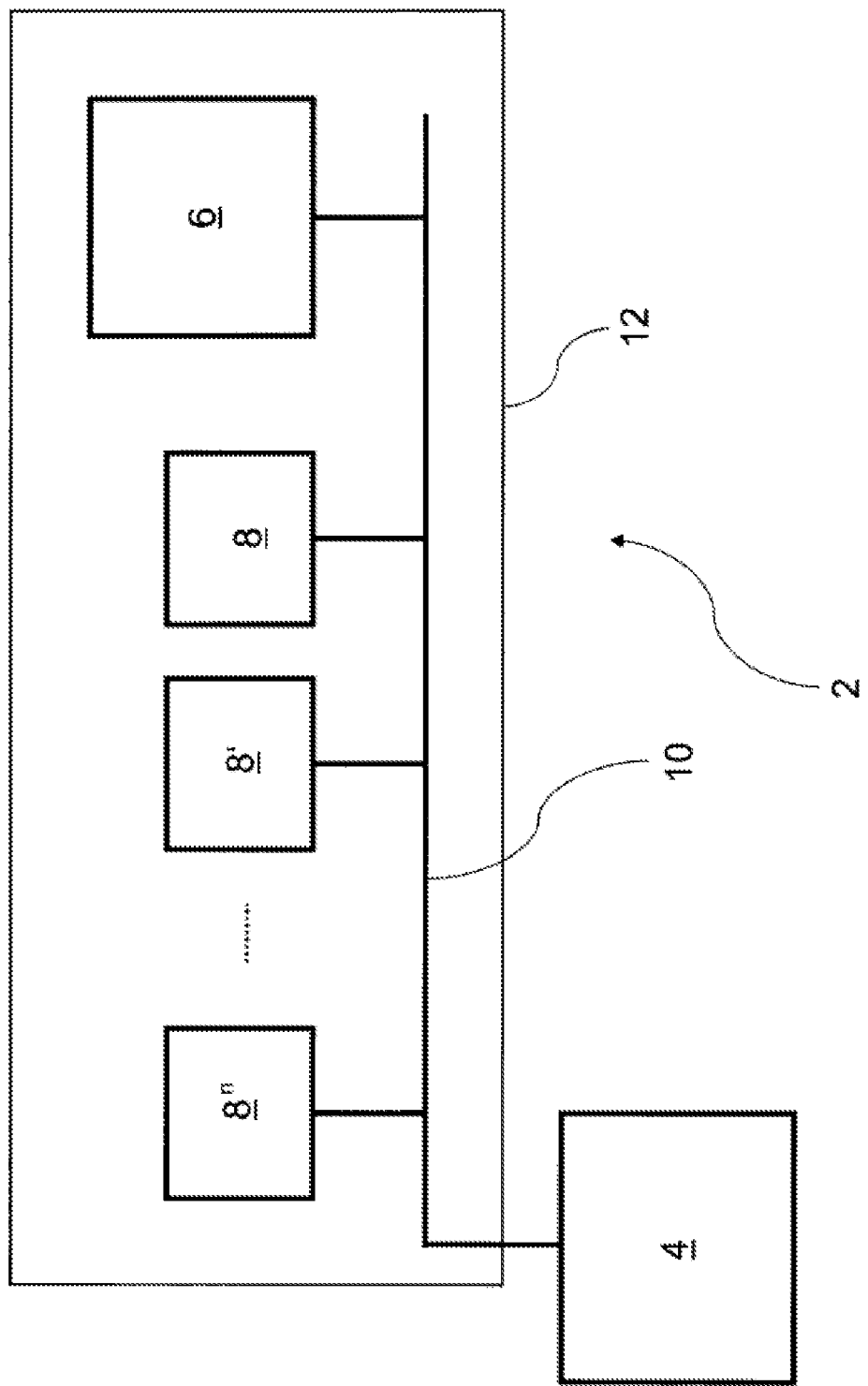
FIG. 1 shows a schematic block diagram to illustrate a variant embodiment of an inventive bus system.

Identical reference numerals have been used for the same elements, or elements having the same effects, according to the invention. For the sake of clarity of representation, in a given figure only those reference numerals have been employed which are necessary for the description of that figure. The embodiments which are illustrated are only examples of possible realizations of the inventive system and/or method, and do not limit the scope of the invention.

In FIG. 1, a schematic block diagram of a possible variant embodiment of an inventive bus system 2 is presented. The bus system 2 shown comprises a master component 4 and a plurality of slave components (6, 8), in particular a first slave component 6 and a plurality of second slave components (represented by 8, 8', and 8"). The first slave component 6 and the second slave components (8, 8', 8") are components of a system 12, which may be comprised of a vehicle seat or the like which may be provided with climate control means, wherewith the slave components are associated with electrical components.

The slave components (6; 8, 8, 8" are interconnected by a single bus line 10 for transmission of electrical data signals, which bus line not only couples the slave components (6; 8, 8', 8") together but connects them to the master component 4, beyond the boundaries of the system 12, in terms of signaling. The messages transmitted via signals in the bus line 10 reduce the master component 4 to merely a functional stage within the system 12, with the first slave component 6 assuming the central control function within the system 12. Thus, the first slave component 6, within the system 12, can at least preferentially and/or regarding specific functions function as similarly to a master, as an issuer of commands for the second slave components (8, 8', 8") or for at least one of the second slave components (8, 8', 8"). The central control function can also be completely taken over by the command issuer. Alternatively, the control function may be exercised also by, e.g., a "body control module", a climate control apparatus, or a "seat control module".

Figure 2:
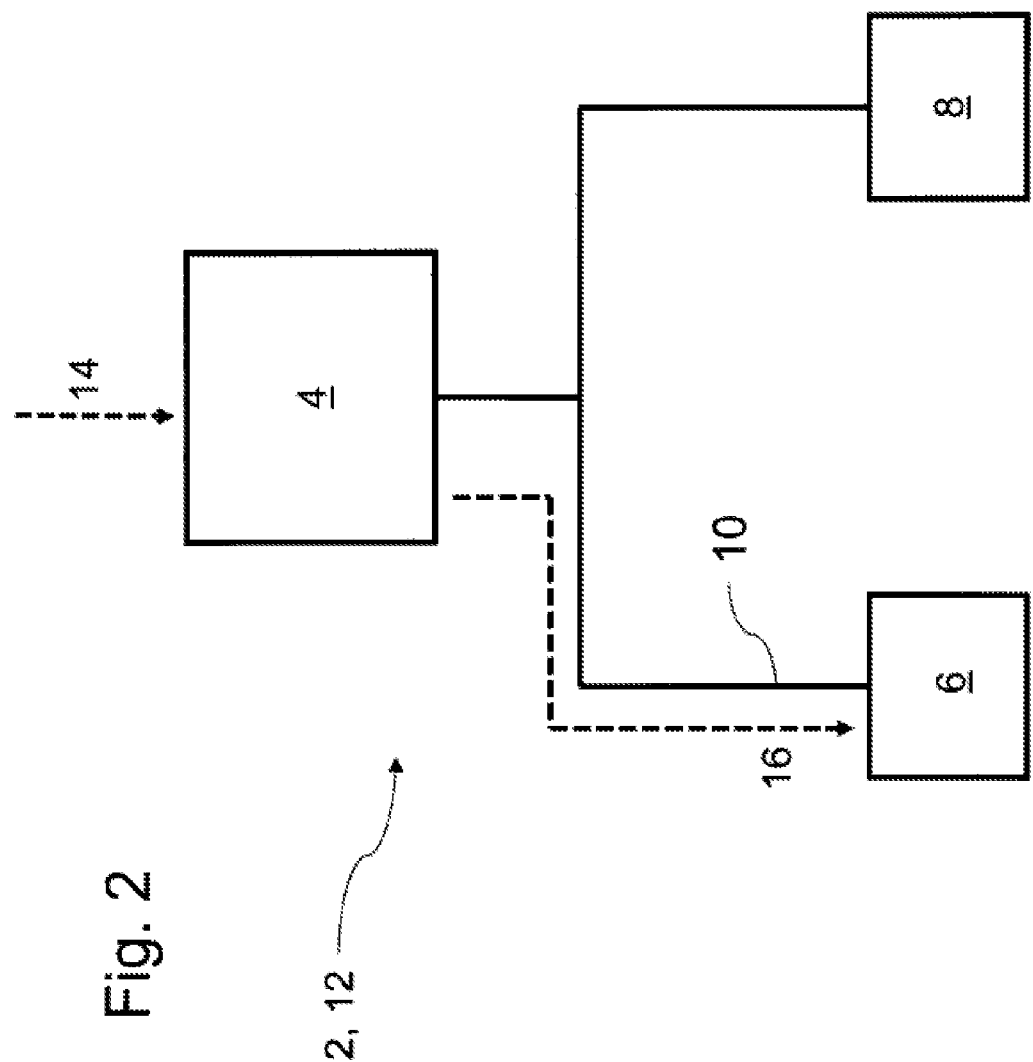
FIG. 2 shows another schematic block diagram, illustrating a useful control arrangement within the inventive bus system.

The block diagram of FIG. 2 shows, as an example, a possible useful control arrangement in the inventive bus system 2. The master component 4 receives a control command from an operating or actuating unit 24 (not shown here—see FIG. 5) for operating the system 12, which command is represented by the arrow 14.

Based on the functional status ("functional stage") of the master component 4 within the system 12, the master component 4 passes the control command to the first slave component 6, via the bus line 10. The transmission of the control command is symbolized by the arrow 16. Since the function transmitted with the control command 16 is within the functional range of the first slave component 6, the control command 16 is also executed by the first slave component 6. Initially, the second slave component 8 shown in FIG. 2 and coupled with the master component 4 and the first slave component 6 via the bus line 10 does not receive any control command, and does not carry out any action.

Figure 3:
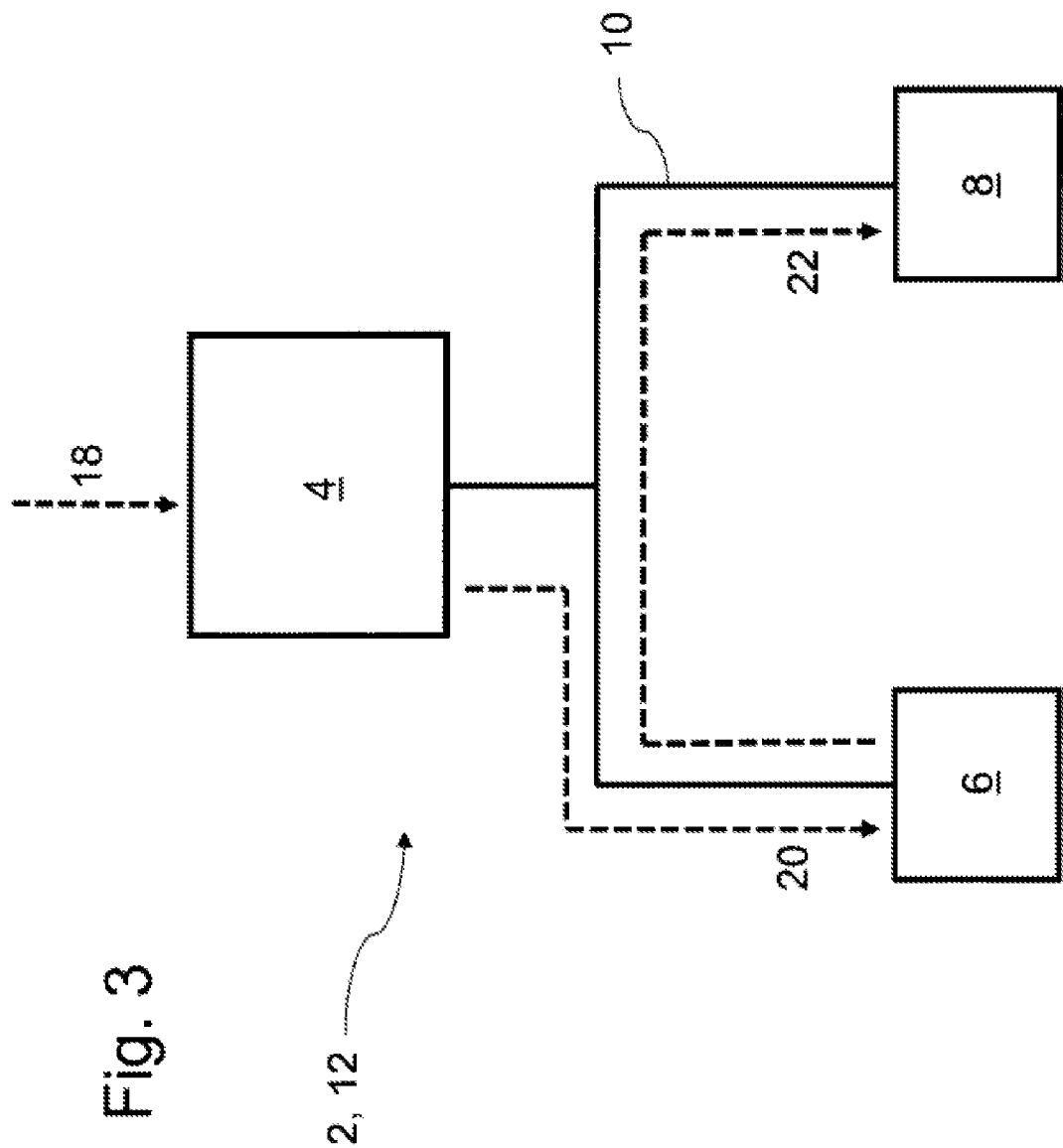
FIG. 3 shows a schematic representation of another control arrangement within the inventive bus system.

Another possible control arrangement in the inventive bus system 2 is illustrated, as an example, in the block diagram of FIG. 3. The master component 4 receives a control command for operating the system 12 from an operating or actuating unit 24 (not shown in FIG. 3 but shown in FIG. 5), which control command is symbolized by the arrow 18.

Based on the functional status ("functional stage") of the master component 4, which has been reduced within the system, the master component 4 passes the control command to the first slave component 6, via the bus line 10. This control command is symbolized by the arrow 20. The contents (information contents) of the control command 20 are evaluated by a central control means (here component 6), in conjunction with other parameters available to the component 6, whereby a control command 22 is generated. The contents of the control command 20 fall within the functional domain of the second slave component 8. Since the first slave component 6 is exercising a central control function, following a request from (via) the master component 4 and via the bus line 10 the first slave component 6 can transmit the command to the second slave component 8. The transmission of this control command is symbolized by the arrow 22. Then the second slave component 8 can exercise the control command (20, 22).

Figure 4:
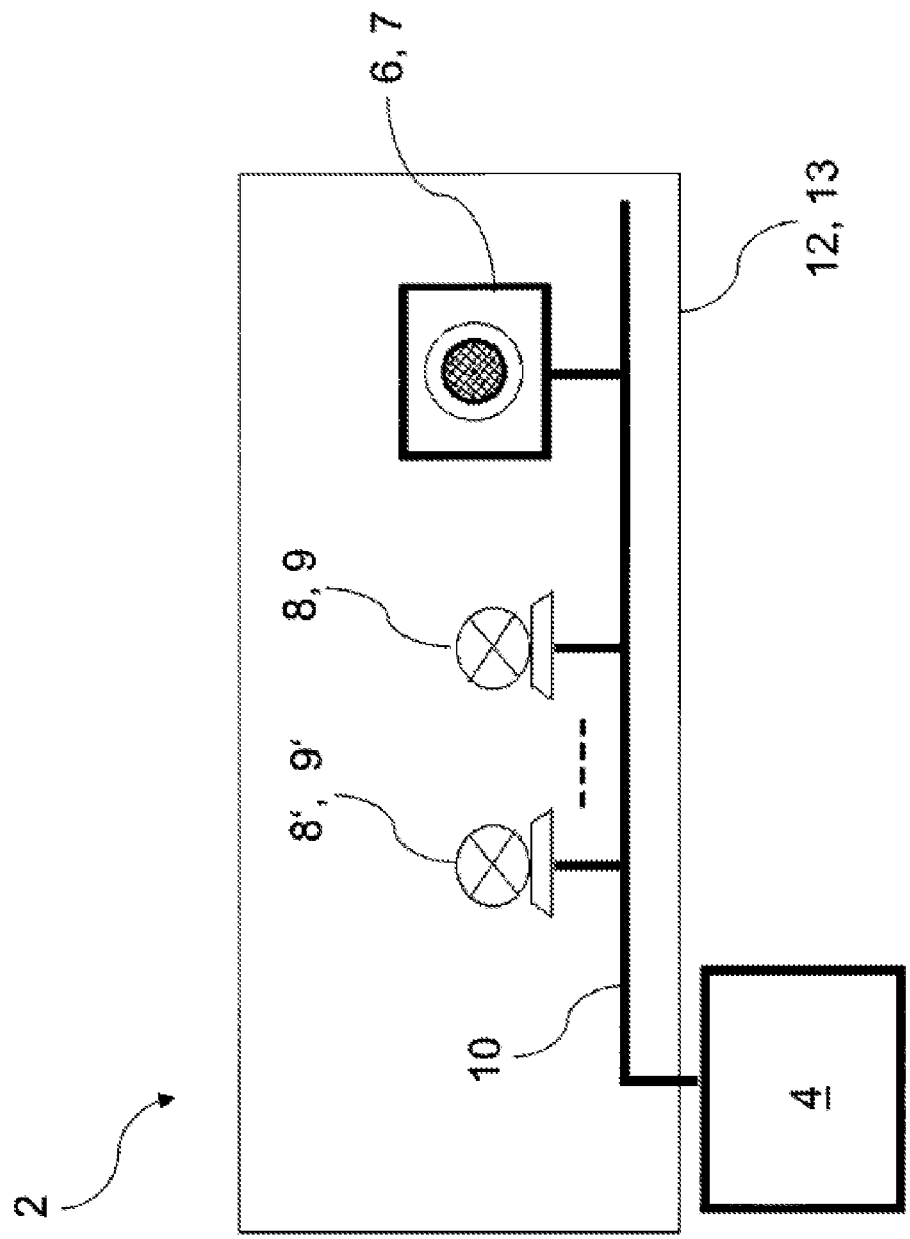
FIG. 4 shows a schematic representation of an inventive bus system, in the example of a climate-controlled seat of a motor vehicle.

The schematic representation according to FIG. 4 represents the inventive bus system 2 as applied to the example of a climate-controlled device of a climate-controlled seat, which seat may be in particular a vehicle seat which is subject to climate control means. Once again the bus system 2 is comprised of the master component 4. For optimal functioning of the climate-controlled device, a first slave component 6 in the form of a seat heating component 7 is provided in the climate-controlled seat system 13. Also, the climate-controlled seat system 13 has two second slave components (8, 8') in the form of seat ventilation components (9, 9'). The seat heating and seat ventilation components (7; 9, 9') are connected to the master component beyond the climate-controlled seat system 13 via the bus line 12. The data signals sent by the master component and transmitted by the bus line 10 reduce the master component 4, e.g., to merely a functional stage. Here the seat heating component 7, as the first slave component 6, assumes the central control function of the system (12, 13). Based on its central control function, the seat heating component 7 recognizes from the signals which are transmitted whether these signals contain signal components which are intended for a climate control device of the climate-controlled seat system 13. If this is the case, the signals are employed for control of functions; otherwise, the signals are not so employed.

Figure 5:
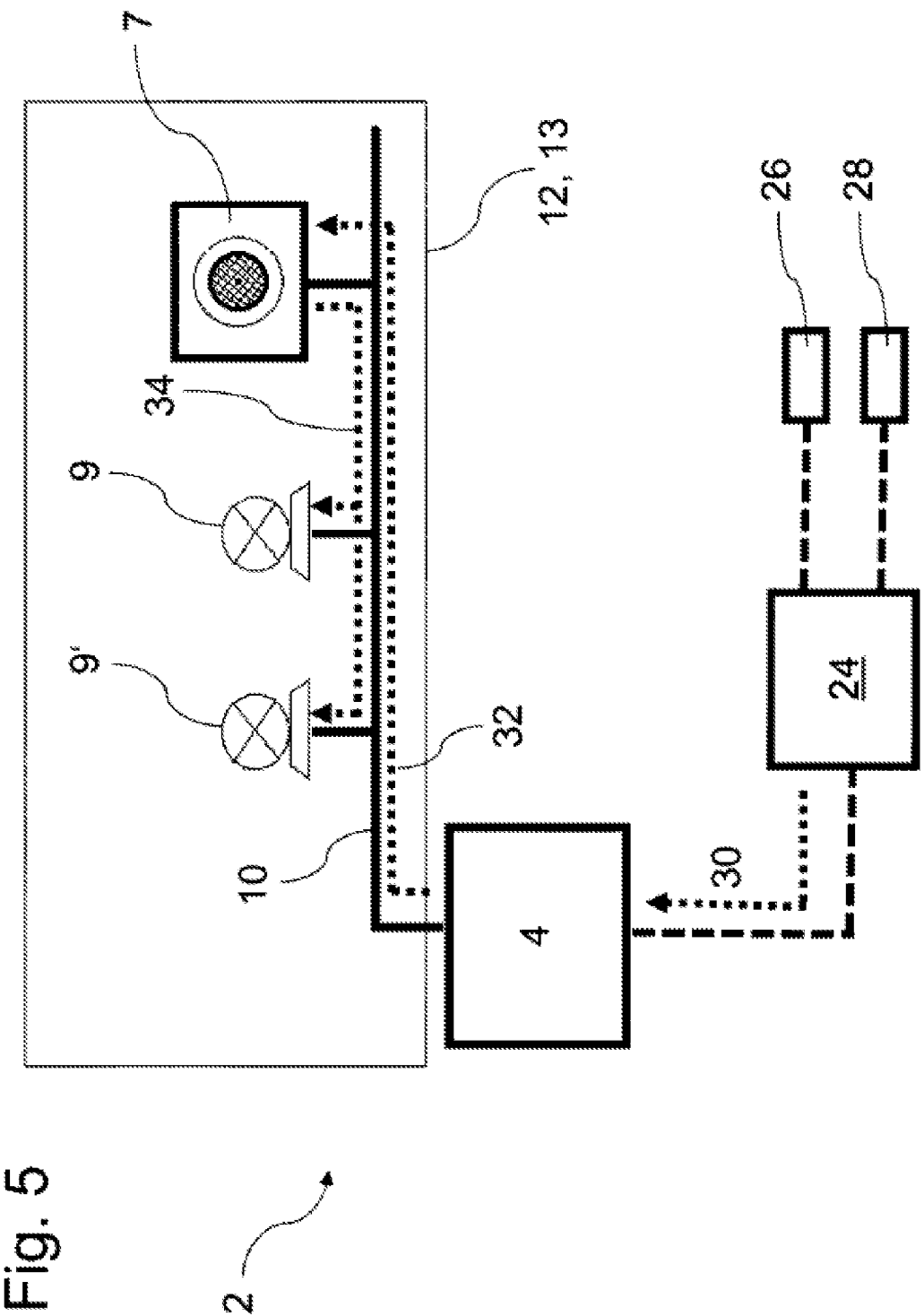
FIG. 5 shows another schematic representation of the control arrangement in an inventive bus system, for a climate-controlled seat of a motor vehicle.

In the schematic representation, according to FIG. 5, another example is provided of a control arrangement within the inventive bus system 2 for a climate control device. It is seen that operating elements 26 and 28 are provided; the operating element 26 serves for adjusting the seat heating component 7, and the operating element 28 serves for adjusting the seat ventilation component (9 or 9'). The operating elements (26, 28) are coupled to an operating unit 24 for operating and adjusting the climate-controlled seat system 13. The operating unit (or actuating unit) 24 is linked to the master component 4, in signaling terms. Data signals, or data commands, symbolized by the arrow 30, are transmitted from the operating unit 24 to the master component 4. The master component 4 transmits the command which it receives to the seat heating component 7, via the bus line 10, which component 7 has the central control function. The transmission of the data command is symbolized by the arrow 32. If the command constitutes an adjusting command for the seat heating component 7, the command is processed by the seat heating component 7. If the adjusting command is a command for adjusting one of the seat ventilation components (9, 9'), in response to a request via the master component 4 the seat heating component 7 transmits appropriate messages to the seat ventilation components (9, 9'), as symbolized by the arrow 34.

Figure 6:
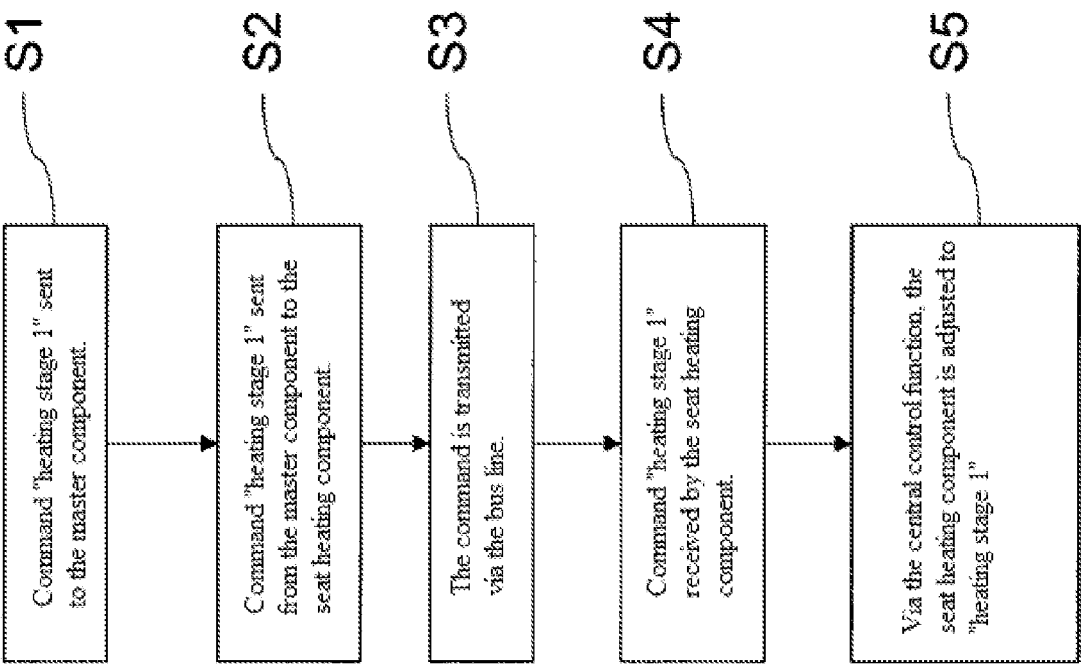
FIG. 6 illustrates the control sequence in an inventive bus system.

FIG. 6 illustrates an example of a first control sequence within an inventive bus system 2. In step S1, the master component 4 receives a command to adjust the seat heating component 7 to "heating stage 1". In the next step, S2, the master component 4 transmits the command "heating stage 1" to the seat heating component 7, via the bus line 10 (see step S3). In step S4, the command "heating stage 1" is received by the seat heating component 7. Given that the command "heating stage 1" relates to the seat heating component 7, in step S5 the seat heating component is set to "heating stage 1".

Figure 7:
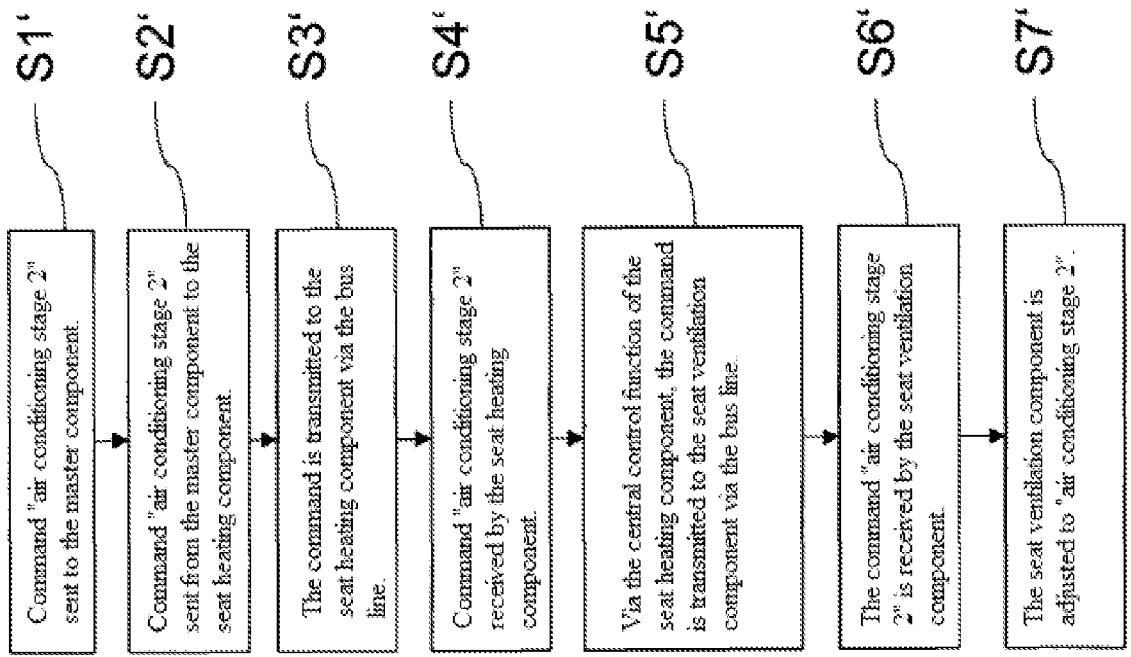
FIG. 7 illustrates another control sequence in an inventive bus system.

FIG. 7 illustrates an example of a second control sequence within an inventive bus system 2. In step S1', the master component 4 receives a command to adjust the seat ventilation component to "air conditioning stage 2". In the second step S2; the master component 4 transmits the command "air conditioning stage 2" to the seat heating component 7, via the bus line 10 (see step S3'). In step S4', the command "air conditioning stage 2" is received by the seat heating component 7. Since the command "air conditioning stage 2" does not relate to the seat heating component 7, in step S5', following a request via the master component 4, the command is transmitted from the seat heating component 7 to the seat ventilation component 9, via the bus line 10. Following the receipt of the command "air conditioning stage 2" by the seat ventilation component 9 in step S6', adjustment of the seat ventilation component 9 to "air conditioning stage 2" can be carried out (see step S7').

It may also be provided that the seat heating component not only copies and forwards the command but first process or converts it. Thus, e.g., not only is the content "air conditioning stage 2" transmitted to the ventilation means, but also the content "rotational speed 80%".

The invention has been described above with reference to a preferred embodiment. However, it will be apparent to a person skilled in the art that modifications and refinements of the invention are possible without departing from the scope of the claims set forth hereinbelow.

LIST OF REFERENCE NUMERALS

2 Bus system.
4 Master component.
6 First slave component.
7 Seat heating component.
8 Second slave component.
8' Second slave component.
8" Second slave component.
9 Seat ventilation device.
9' Seat ventilation device.
10 Bus line.
12 System
13 Climate-controlled seat system
14 Transmission of the command (control command).
16 Transmission of the command (control command).
18 Transmission of the command (control command).
20 Transmission of the command (control command).
22 Transmission of the command (transmitted control command).
24 Operating unit (or actuating unit).
26 Operating unit of seat heating component.
28 Operating unit of seat ventilation element.
30 Transmission of the command.
32 Transmission of the command.

34 Transmission of the command.
S1 Step 1 of the first control sequence.
S2 Step 2 of the first control sequence.
S3 Step 3 of the first control sequence.
S4 Step 4 of the first control sequence.
S5 Step 5 of the first control sequence.
S1' Step 1 of the second control sequence.
S2' Step 2 of the second control sequence.
S3' Step 3 of the second control sequence.
S4' Step 4 of the second control sequence.
S5' Step 5 of the second control sequence.
S6' Step 6 of the second control sequence.
S7' Step 7 of the second control sequence.

The invention claimed is:

1. A bus system comprising:
a plurality of electrical and/or electronic components coupled to one another in terms of signaling via at least one bus line, the plurality of electrical and/or electronic components including:
at least one master component and
at least two slave components including at least a first slave component and a second slave component;
wherein the first slave component is at least one heating device and the second slave component is at least one ventilation means;
wherein the first slave component functions as a master for the second slave component or a plurality of the at least two slave components, including the second slave component, for at least one operating parameter, under at least certain conditions; and
wherein a central control function for a system to be controlled is associated with the first slave component, and the central control function is transmitted to other components or to an entire system to be controlled, and bus signals and/or bus messages that are transmitted to the first slave component are evaluated by the first slave component.

2. The bus system according to claim 1, wherein a role of a command issuer is assumed in reference to the at least one operating parameter and/or in reference to a certain operating mode by the first slave component.

3. The bus system according to claim 1, wherein at least one of the at least two slave components determines at least one set point operating parameter of another of the at least two slave components, and transmits the at least one set point operating parameter to the first slave component and/or to the at least one master component.

4. The bus system according to claim 1, wherein the first slave component recognizes a status of the first slave component as a component of the entire system to be controlled.

5. The bus system according to claim 1, wherein the bus system is equipped with a LIN bus line and/or a CAN bus line.

6. A climate control device having the bus system according to claim 1,
wherein the at least one heating device calculates at least one set point operating parameter of the at least one ventilation means and sends the at least one set point operating parameter to the at least one ventilation means as a control signal, via the at least one bus line.

7. A method for controlling a bus system, wherein the bus system is comprised of a plurality of electrical and/or electronic components coupled to one another in terms of signaling via at least one bus line;
wherein the plurality of electrical and/or electronic components include at least one master component and at least two slave components that include at least a first slave component and a second slave component;
wherein the first slave component is at least one heating device and the second slave component is at least one ventilation means;
wherein the first slave component functions as a master for one or a plurality of the at least two slave components, for at least one operating parameter, and in so functioning as the master the at least one heating device is configured to calculate at least one set point operating parameter of the at least one ventilation means, and then send the at least one set point operating parameter to the at least one ventilation means as a control signal, via the at least one bus line;
wherein the method includes a step of transmitting a central control function for a system to be controlled, that is associated with the first slave component, to other components or to an entire system to be controlled; and
wherein the method includes a step of evaluating bus signals, bus messages, or both that are transmitted to the first slave component.

8. The method according to claim 7, wherein at least one of the at least two slave components calculate the at least one set point operating parameter of another of the at least two slave components and transmits the at least one set point operating parameter to the first slave component and/or to the at least one master component.

9. The method according to claim 7, wherein the method includes a step of the first slave component recognizing a status of the first slave component as a component of the system to be controlled.

10. The method according to claim 7, wherein the first slave component transmits appropriate signals to the second slave component associated with the first slave component, only after a request via the at least one master component.

11. The method according to claim 10, wherein the first slave component further processes the signals from the at least one master component in conjunction with additional information which is available.

12. The bus system according to claim 2, wherein at least one of the at least two slave components determine the at least one set point operating parameter of another of the at least two slave component and transmits the at least one set point operating parameter to the first slave component.

13. The bus system according to claim 4, wherein the bus system is equipped with a LIN bus line and/or a CAN bus line.

14. A climate control device having the bus system according to claim 13,
wherein the at least one heating device calculates the at least one set point operating parameter of the at least one ventilation means and sends the at least one set point operating parameter to the at least one ventilation means as the control signal, via the at least one bus line.

15. The bus system according to claim 1, wherein the second slave component is signally coupled to the at least one master component via the first slave component.

16. The method according to claim 7, wherein the method includes a step of sending a message from the first slave component to the second slave component following a request from the at least one master component.

* * * * *